United States Patent
Waterman

(10) Patent No.: US 7,061,374 B2
(45) Date of Patent: Jun. 13, 2006

(54) COMPUTER ASSISTED DANGER ALARM WITH EMERGENCY BRAKING SYSTEM

(76) Inventor: Serville Alphonso Waterman, 593 Vanderbelt Ave., Suite 218, Brooklyn, NY (US) 11238

( * ) Notice: Subject to any disclaimer, the term of this patent is extended or adjusted under 35 U.S.C. 154(b) by 104 days.

(21) Appl. No.: 10/880,516

(22) Filed: Jul. 1, 2004

(65) Prior Publication Data

US 2006/0001531 A1    Jan. 5, 2006

(51) Int. Cl.
*B60Q 1/00* (2006.01)

(52) U.S. Cl. .................................. 340/435; 340/426.1

(58) Field of Classification Search ............... 340/435, 340/440, 443, 429, 426.1, 426.33, 555, 556, 340/557

See application file for complete search history.

(56) References Cited

U.S. PATENT DOCUMENTS

| | | | | |
|---|---|---|---|---|
| 4,584,569 A | * | 4/1986 | Lopez et al. | 340/566 |
| 5,183,056 A | * | 2/1993 | Dalen et al. | 600/595 |
| 5,214,408 A | * | 5/1993 | Asayama | 340/435 |
| 5,247,296 A | * | 9/1993 | Spies | 340/903 |
| 5,510,765 A | * | 4/1996 | Madau | 340/541 |
| 5,623,245 A | * | 4/1997 | Gilmore | 340/426.12 |
| 5,801,618 A | * | 9/1998 | Jenkins | 340/426.14 |
| 6,875,976 B1 | * | 4/2005 | Breed et al. | 250/221 |

\* cited by examiner

*Primary Examiner*—John Tweel, Jr.
(74) *Attorney, Agent, or Firm*—Judi Adele Plotkin

(57) ABSTRACT

A computer assisted early warning and emergency braking system for a vehicle is disclosed in which a computer system responds to abnormal tire and/or road sensor data by generating a signal which activates the horn, thereby alerting the driver that the vehicle is in an unsafe condition. The computer may commence rapid braking in order to avoid a dangerous situation if appropriate driver corrections do not occur in a timely fashion. Therefore, the present invention provides an increased margin of safety, particularly when the vehicle is travelling at higher speeds. The present invention can also alert others when a driver is not responding with appropriate corrective action, such as might be the case during sickness, slumping over the wheel due to a heart attack, being asleep at the wheel, etc. In the case of a false alarm, the driver can inactivate the system by manual activation of the vehicle horn. In the case of a non-responsive driver, the option for the activation of an emergency locator system can be included.

20 Claims, 1 Drawing Sheet

COMPUTER ASSISTED DANGER ALARM WITH EMERGENCY BRAKING SYSTEM

BACKGROUND

To enhance the safety of a vehicle and passengers in present-day road traffic, in addition to providing extra-vehicular traffic guidance systems, efforts are being made to support the operator in routine driving operations as well as in extraordinary situations using systems that intervene automatically in the control of the vehicle or of particular vehicle components. Some systems involve GPS tracking with a central evaluation unit that can handle multiple vehicles simultaneously. More commonly, control safety devices are built into vehicles.

A first step in this direction was the adoption of antilock braking systems (ABS) and anti-slip regulation (ASR) to enhance longitudinal vehicle stability during braking and accelerating processes. Emergency triggering of such systems has been developed in response to a variety of sensor data. Sensor data may be data on the condition of the vehicle operator, the condition of the vehicle, or the condition of the environment around the vehicle.

In addition, use is made of so-called dynamic regulation (DR) and/or stability regulation (SR) to enhance transverse stability in dynamically critical situations, particularly in situations brought about and influenced by steering-wheel action taken by the operator. DR evaluates sensor data provided by suitable sensors from particular vehicle components or from the vehicle as a whole and correlates the data using special algorithms. In this way it is possible to recognize critical situations and, by taking positive action with respect to individual parameters of vehicle dynamics (for example steering-wheel angle and/or speed and acceleration), to influence the vehicle positively with reference to the transverse dynamically critically situation. Here especially the traction between the tires and the roadway also plays an important part, since the transmission of force between the vehicle and the roadway during vehicle control actions depends directly upon the traction.

However, DR acts according to pre-programmed parameters and limits with reference to the environment of the vehicle, comprising, for example, the road condition and other moving vehicles in the vicinity. Thus DR alone cannot be employed to evaluate the effectiveness of physically meaningful control actions affecting the motion of the vehicle. From the data reported concerning the environment and the vehicle's condition or motion parameters, the DR or SR evaluating unit continuously calculates target parameters for influencing the motion of the vehicle. These target parameters may be used to control the vehicle directly, but they are also analyzed to ascertain whether a conceivable collision may yet be prevented or is imminent. If a predetermined critical level of danger is not recognized by these analyses, the operator of the vehicle retains complete freedom to decide how to correct for dangers such as how to avoid an obstacle. Only when impending collision ascertained by the evaluating unit is no longer avoidable by any conceivable rational steering and/or braking control of the vehicle will an automatic emergency braking to produce rapid deceleration of the vehicle be triggered. Clearly there exist limits on the effectiveness of such a system given the difficulties of programming an evaluation unit with data adequate to the calculation of the vast array of conditions and responses possible. Inadequacy of such programming can lead to unnecessary loss of operator control of the vehicle if the evaluating unit takes over due to faulty parameter evaluation.

In these systems the type of sensors utilized can be selected from any number of commercially available sensors such as motion sensors, infrared sensors, position sensors, audio sensors, video sensors, chemical sensors, sound sensors, touch sensors or radio frequency sensors, or any combination thereof. The data from the sensors are processed according to pre-determined concepts of what the safety limits are for the components being monitored. When the limits are violated, response mechanisms are triggered and are known in general to include a variety of warning signals and ways to enable or to disable various components of the vehicle.

Gehlot in U.S. Pat. No. 6,060,989 describes in general such a system for preventing or reducing vehicle accidents comprising one or more sensors positioned on a vehicle sensing a condition or conditions indicative of a driver's ability to effectively control the vehicle and a processing unit in communication with the sensors. The processing unit receives data from the sensors, analyzes the data to determine an appropriate response and initiates the response. The plurality of sensors senses a condition such as steering column movement, driver head movement, driver eye movement, driver body movement, slurred speech, snoring, alcohol in breath, road conditions, proximity to road side edges, proximity to road paint strips or roadway obstacles. An audio signal may be initiated at the same time the corrective response is initiated by the processing unit to alert the operator and others in the vicinity. No details are provided as to what type of audio signal could be given. Further, no mention of sensors to detect tire conditions is included.

While Gehlot is primarily focused on operator ability to effectively control the vehicle, Mai, et al. in U.S. Pat. No. 6,084,508 describes a method and arrangement for emergency braking of a vehicle that includes a detection system on the vehicle which detects obstacles located in or near the direction of motion of the vehicle and generates corresponding data in an evaluating unit. Upon determining that an impending collision of the vehicle with an obstacle is no longer avoidable by any action on the vehicle by steering or braking, the system triggers an automatic emergency braking for rapid deceleration of the vehicle. The sensors may include sensors for detecting at least one of steering angle, vehicle speed and vehicle angle of yaw, or for determining the traction between roadway and the vehicle tires. Preferred sensors include at least one of a radar sensor and a laser sensor. No early warning signals are given and tire condition is not disclosed as measured by the sensors.

Vallancourt in U.S. Pat. No. 6,263,282 describes a dangerous driving condition warning system for a vehicle. The warning system captures signals from two or more devices in an automobile, such as speedometer, distance measuring device, and airbag, and conveys the signals to a decision circuit. The decision circuit determines whether a dangerous driving condition exists and outputs an activation signal upon detecting a dangerous condition. The activation signal is sent to and activates an indicator such as a warning light or loud audible warning. The warning indicator alerts a trailing vehicle and other vehicles near the vehicle equipped with the warning system of the existence of one of various conditions warranting caution, a reduction in speed, or a veering or turn. The decision circuit is capable of detecting one or more dangerous driving conditions in the group consisting of anti-lock brake activation, slippery road conditions from loss of adequate traction, tailgating, rapid deceleration, airbag deployment, and excessive approach speed by another automobile. The early warning system is intended as a cautionary signal for others in the vicinity and not discussed as a warning to alert the operator to the need for corrective action.

U.S. Pat. No. 5,481,243 to Lurie, describes a vehicle deceleration detection circuitry system, whereby the rear brake lights of an automotive vehicle may be controlled as a function of the deceleration of the vehicle. Lurie also contemplates an additional audible alert buzzer or horn that is activated to provide additional warning in the event of emergency braking. Again the audible warning is concurrent with the emergency deceleration/braking and not intended as an early alert to the driver as to the need for corrective action.

Lisiak, et al. in U.S. Pat. No. 6,271,746 describes methods and devices for controlling the use of an automotive horn as a function of the speed, motion, vibration or acceleration of the automotive vehicle. The invention contemplates methods and devices for disabling the automotive horn for a certain period of time, abating the volume or noise level of the horn, or modifying the tone or sound of the horn to a tone or sound considered less offensive. In certain embodiments, the method of control includes electronic methods for controlling the horn by connection to the speedometer, accelerometer or braking system of the vehicle. Alternatively, motion sensors, vibration sensors, or acceleration sensors may be used to control the horn. For example, the invention contemplates a device that will disable the horn upon the attainment of a predetermined reading or value on one or more of the sensors for speed, brake activation, motion, vibration, acceleration or deceleration. The use of the horn in this scenario is considered to be excessive and needing to be curbed by various disabling or muting mechanisms. The operator can not force a return to normal horn functioning except after a predefined lock-out control period of time.

Automotive horns are installed in almost all automobiles, trucks and other automotive vehicles. Automotive horns are intended for use as a warning device to provide warning to other drivers, bicyclists, pedestrians, bystanders, or animals of potentially dangerous conditions in the vicinity of the automobile. For example, the horn may be used to warn pedestrians or persons in the path or vicinity of a moving vehicle of the presence or location of the vehicle. However automotive horns are not commonly described as alert warning devices for vehicle operators. The present invention overcomes this oversight.

The prior art systems and reliance on police presence are inadequate to meet the demands of eliminating or reducing drunk drivers and those who are too tired or ill to be driving effectively. Further, there is a need for better early detection of and alerting of the operator to unsafe driving conditions to allow effective operator intervention as well as for rapid emergency braking should operator intervention be ineffective.

SUMMARY

Figure 1:
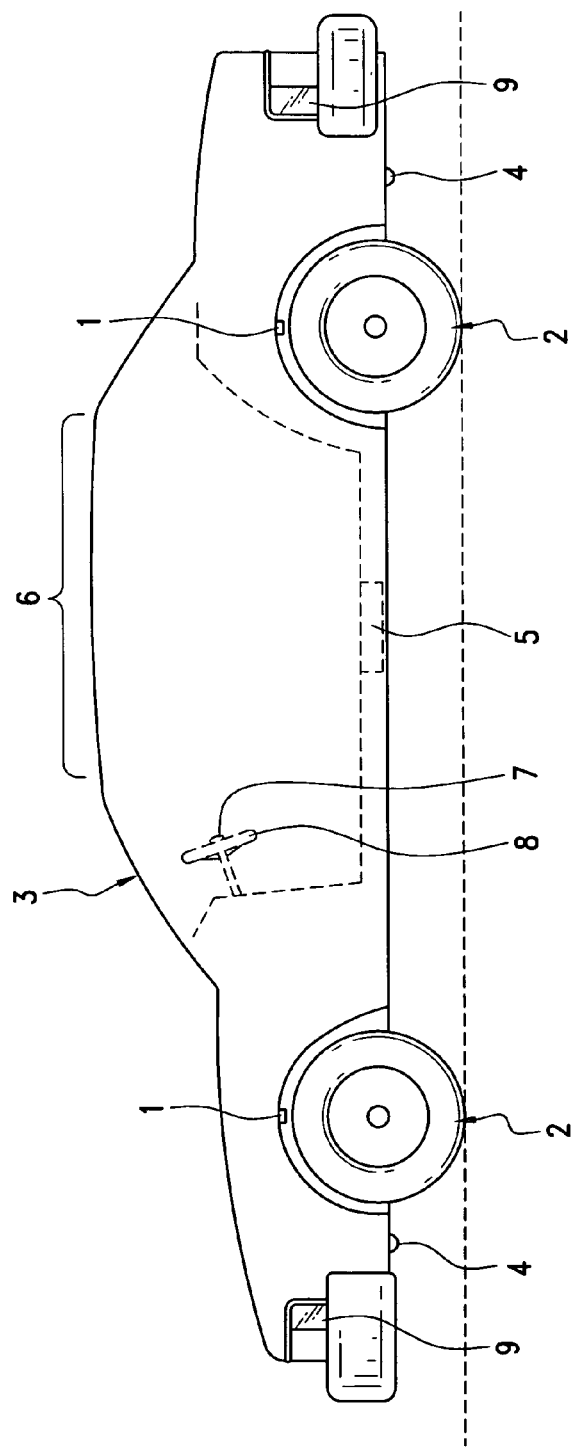
FIG. 1 shows a preferred embodiment of the placement of the sensors and computer evaluation and response activation unit in a four wheeled vehicle.

The present invention is directed to an emergency braking and early warning system for a vehicle in which a computer system responds to abnormal tire and/or road sensor data by generating a signal to activate the automotive horn. The system thereby alerts the driver that the vehicle is in an unsafe condition and may commence rapid braking if appropriate driver corrections do not occur. Therefore, the present invention provides an increased margin of safety, particularly when the vehicle is travelling at higher speeds. The present invention can also alert others when a driver is not responding with appropriate corrective action, such as might be the case during sickness, slumping over the wheel due to a heart attack, being asleep at the wheel, etc.

The present invention is directed to saving lives by preventing or reducing fatal vehicle accidents. The present invention relates to a system and method for preventing or reducing accidents caused by driving while intoxicated (DWI) and other driver impairments, such as drowsiness that may be due to lack of sleep, long driving hours, fatigue, or side effects of medication, etc. The present invention could also reduce vehicle insurance rates for all drivers by reducing and/or eliminating vehicle accidents caused by the aforementioned.

The present invention is also directed to saving lives and reducing injuries resulting from tire failure and associated loss of adequate vehicular control by the operator.

The present invention is further directed to an emergency braking and early warning system for a vehicle in which a computer system responds to abnormal tire and/or road sensor data by generating a signal to activate the automotive horn which can be turned off by manual activation off the automotive horn by the vehicle operator, such as by pressing on an activation plate on the steering wheel. Should the operator choose to press the horn, not only will the horn stop sounding, but also the automatic emergency braking need detected by the computer processing unit will be cancelled.

The present invention is additionally directed to an emergency braking and early warning system for a vehicle in which a computer system responds to abnormal tire and/or road sensor data by generating a signal to activate the automotive horn and, optionally, other components of the vehicle such as transponders or emergency locator systems in order to alert others outside of the vicinity that an emergency situation exists. Should the vehicle become disabled as the result of an emergency situation or accident, the response option of automatic enabling of an emergency transponder or remote locator system can be included.

The present invention is additionally directed to an emergency braking and early warning system for a vehicle in which a computer system responds to abnormal tire and/or road sensor data by generating a signal to activate the automotive horn and, optionally, other components of the vehicle such as hazard lights or flashers in order to alert others in the vicinity that a potentially hazardous situation exists.

DETAILED DESCRIPTION OF THE INVENTION

The present invention is a computer assisted emergency warning and braking system using multiple sensors mounted on the underside of a vehicle to monitor tire and road conditions by measuring the distances between the vehicle and the tires and the distances of the various vehicle parts from the road. A computer mounted on the car under the passenger compartment or trunk continuously receives and analyzes the sensors' output data. Each type of vehicle will have a range of acceptable sensor data analyzed for each predetermined unit of time, typically falling within the range of two to six inches. Values outside of the acceptable range will trigger the computer to activate the automotive horn to alert the vehicle operator. If the erratic sensor reading is temporary such as with a very large pothole or if there is no emergency, the vehicle operator can deactivate the warning horn and the automatic breaking system (ABS) by pressing on the manual horn activation mechanism.

If the sensor values are close to the acceptable values, the horn may be activated by the computer first with a brief gap in time before the ABS is activated by the computer, thereby allowing the operator time to deactivate the system if there really isn't an emergency. If however the sensor values are far from acceptable values as would occur in a tire blow-out, the ABS will be activated simultaneously with the automotive horn. This will bring the vehicle to a complete stop. At the same time, other components of the vehicle, such as flashers (hazard lights), can be activated in order to alert others in the vicinity that a potentially hazardous situation exists.

Additionally, the sensor system can detect erratic driving or if the vehicle has left the road. If either of these conditions is sensed, the automotive horn and the ABS will be activated by the computer and the vehicle brought to a stop. Further, if either end of the vehicle has left the ground more than a given maximum pre-determined parameter, the horn will be sounded immediately and the ABS will kick in until the vehicle is fully stopped. In the case of the system detecting an unsafe situation and activating the horn without driver response, the option of automatic activation of an emergency locator transponder or of a remote sensing locator (for example, a GPS system capable of monitoring many vehicles) can be included in the computer programming. This feature can be particularly important for driver health related, mechanical failure related, or weather related emergency situations arising in isolated areas and for when the vehicle may no longer be visible from the road.

The computer can be pre-programmed with known range limits for a given vehicle type. Alternatively, the newly installed sensor and computer system can be supplied with a program that can take initial measurements on a new vehicle and calculate what the acceptable parameter ranges are. Such a program would be useful in adjusting parameter ranges for other situations such as for a change in tire size or for unusually rough or uneven terrain. In addition to such a program, a manual re-set of the limits can be done by the vehicle operator.

An example embodiment (FIG. 1) for a four wheeled vehicle has a sensor mounted above each tire (1) to determine the distance between the tires (2) and the vehicle (3) and another sensor in front of or behind each wheel to monitor the road (4). Hence a minimum of two sensors is associated with each tire: one to monitor tire to vehicle distance and the other to monitor road condition including road to vehicle distance. The computer system (5) constantly receiving and evaluating the data from the sensors is mounted under the passenger compartment (6). The computer (5) can activate the automotive horn (7) located on the steering wheel (8). The computer (5) can also activate the automatic braking system (ABS) (not shown) and, optionally, hazard light flashers (9). Preferred sensors for use are laser sensors such as laser radar sensors.

While there have been described particular embodiments of the invention, those skilled in the art will realize that changes and modifications can be made thereto that fall within the scope of this invention without departing from the spirit of the invention. All such changes and modifications within the true scope of the invention therefore are covered by the claims attached herewith below.

What is claimed is:

1. A vehicle danger alert and emergency braking system comprising:
   a. a vehicle on a surface;
   b. at least two tires;
   c. a first sensor means attached to said vehicle to measure the distances between said tires and said vehicle;
   d. a second sensor means attached to said vehicle to measure the distance between said vehicle and said surface;
   e. a control unit to evaluate sensor data from said first sensor means and said second sensor means and to activate appropriate safety measure responses as needed;
   f. an automotive horn in said vehicle with a manual horn activation mechanism;
   g. hazard light flashers;
   h. optionally, a locator means to provide location of the vehicle information to a remote monitor and
   i. an automatic braking system (ABS);
   wherein said appropriate safety measure responses include activation of said automotive horn, activation of said ABS, optionally activation of said hazard light flashers, and optionally activation of said locator means.

2. A vehicle danger alert and emergency braking system comprising:
   a. a vehicle on a surface;
   b. at least two tires;
   c. a first sensor means attached to said vehicle to measure the distances between said tires and said vehicle;
   d. a second sensor means attached to said vehicle to measure the distance between said vehicle and said surface;
   e. a third sensor means attached to said vehicle to measure the condition of said road;
   f. a control unit to evaluate sensor data from said first sensor means, said second sensor means and said third sensor means and to activate appropriate safety measure responses as needed;
   g. an automotive horn in said vehicle with a manual horn activation mechanism;
   h. hazard light flashers;
   i. optionally, a locator means to provide location of the vehicle information to a remote monitor and
   j. an automatic braking system (ABS);
   wherein said appropriate safety measure responses include activation of said automotive horn, activation of said ABS, optionally activation of said hazard light flashers, and optionally activation of said locator means.

3. A vehicle danger alert and emergency braking system comprising:
   a. a vehicle on a surface;
   b. at least two tires;
   c. a first sensor means attached to said vehicle to measure the distances between said tires and said vehicle;
   d. a second sensor means attached to said vehicle to measure the distance between said vehicle and said surface;
   e. a control unit to evaluate sensor data from said first sensor means and said second sensor means and to activate appropriate safety measure responses as needed;
   f. an automotive horn in said vehicle with a manual horn activation mechanism;
   g. hazard light flashers;

h. optionally, a locator means to provide location of the vehicle information to a remote monitor and i. an automatic braking system (ABS);

wherein said appropriate safety measure responses include activation of said automotive horn, activation of said ABS, optionally activation of said hazard light flashers, and optionally activation of said locator means and wherein said activation can be cancelled by a vehicle operator activating said manual horn activation mechanism.

4. The vehicle danger alert and emergency braking system of claim 1 wherein said first sensor means comprises at least one laser sensor per each of said at least two tires.

5. The vehicle danger alert and emergency braking system of claim 1 wherein said second sensor means comprises at least one laser sensor attached to said vehicle near each of said at least two tires.

6. The vehicle danger alert and emergency braking system of claim 1 wherein said vehicle comprises four tires.

7. The vehicle danger alert and emergency braking system of claim 1 wherein said vehicle further comprises a front end and a rear end;

wherein said at least two tires are comprised of at least one front tire and at least one rear tire; and wherein said second sensor means comprises a. at least one sensor located between said front end and each of said at least one front tire and b. at least one sensor located between said rear end and each of said at least one rear tire.

8. The vehicle danger alert and emergency braking system of claim 1 wherein the time of activation of said automotive horn is selected from the group of times prior to said activation of said ABS and a time concurrent with said activation of said ABS.

9. The vehicle danger alert and emergency braking system of claim 2 wherein said first sensor means comprises at least one laser sensor per each of said at least two tires.

10. The vehicle danger alert and emergency braking system of claim 2 wherein said second sensor means comprises at least one laser sensor attached to said vehicle near each of said at least two tires.

11. The vehicle danger alert and emergency braking system of claim 2 wherein said vehicle comprises four tires.

12. The vehicle danger alert and emergency braking system of claim 2 wherein said vehicle further comprises a front end and a rear end;

wherein said at least two tires are comprised of at least one front tire and at least one rear tire; and wherein said second sensor means comprises a. at least one sensor located between said front end and each of said at least one front tire and b. at least one sensor located between said rear end and each of said at least one rear tire.

13. The vehicle danger alert and emergency braking system of claim 2 wherein the time of activation of said automotive horn is selected from the group of times prior to said activation of said ABS and a time concurrent with said activation of said ABS.

14. The vehicle danger alert and emergency braking system of claim 3 wherein said first sensor means comprises at least one laser sensor per each of said at least two tires.

15. The vehicle danger alert and emergency braking system of claim 3 wherein said second sensor means comprises at least one laser sensor attached to said vehicle near each of said at least two tires.

16. The vehicle danger alert and emergency braking system of claim 3 wherein said vehicle comprises four tires.

17. The vehicle danger alert and emergency braking system of claim 3 wherein said vehicle further comprises a front end and a rear end;

wherein said at least two tires are comprised of at least one front tire and at least one rear tire; and wherein said second sensor means comprises a. at least one sensor located between said front end and each of said at least one front tire and b. at least one sensor located between said rear end and each of said at least one rear tire.

18. The vehicle danger alert and emergency braking system of claim 3 wherein the time of activation of said automotive horn is selected from the group of times prior to said activation of said ABS and a time concurrent with said activation of said ABS.

19. The vehicle danger alert and emergency braking system of claim 2 wherein said second sensor means comprises a sensor array and said third sensor means comprises the same said sensor array as said second sensor means.

20. The vehicle danger alert and emergency braking system of claim 1 wherein said activation can be cancelled by a vehicle operator activating said manual horn activation mechanism.

* * * * *